Figure 4:
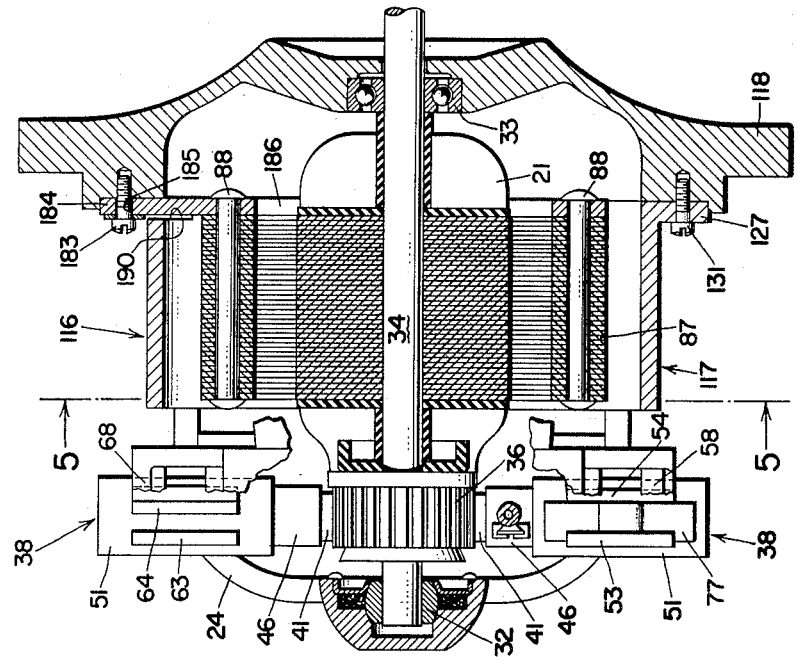

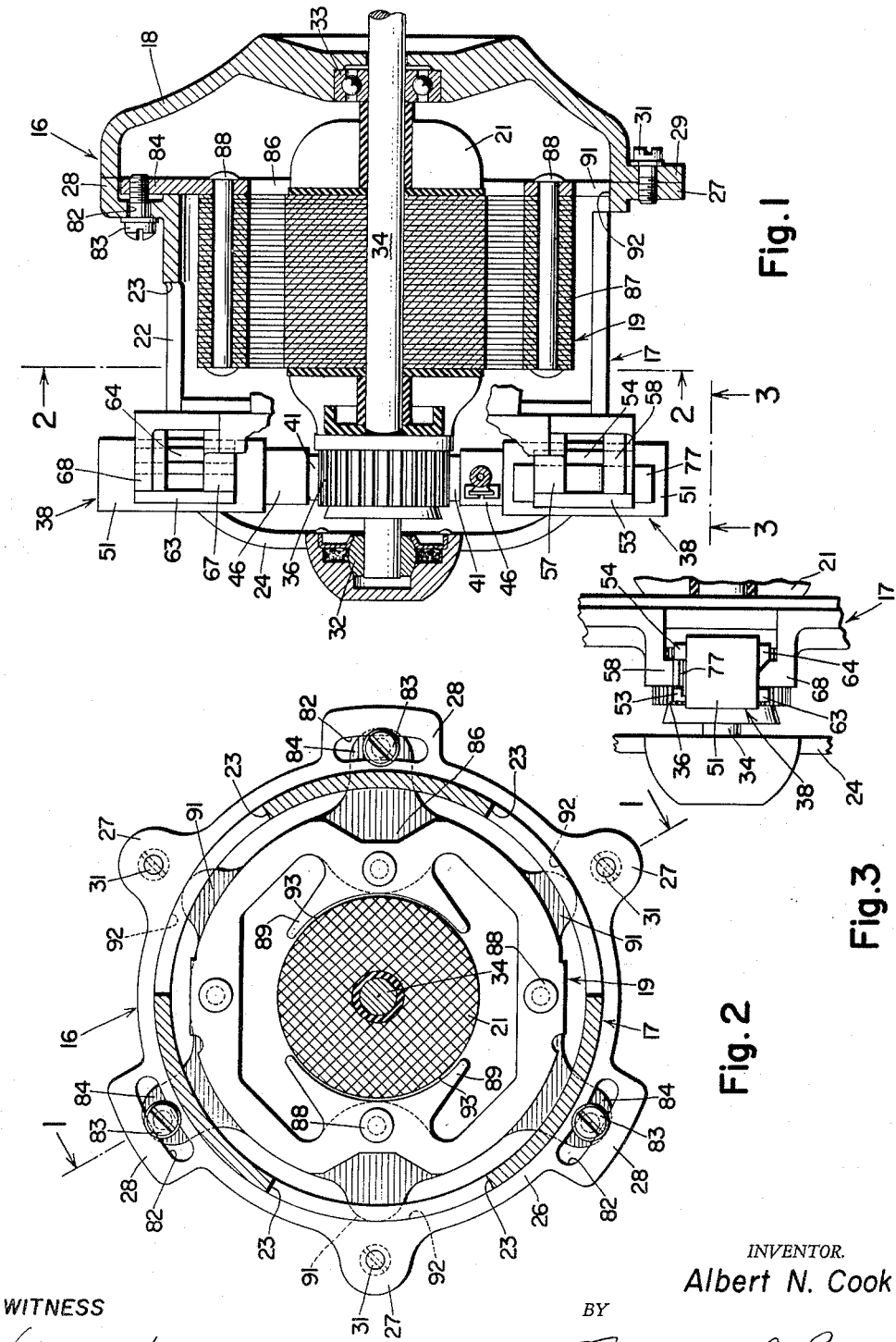

Dec. 17, 1963  A. N. COOK  3,114,852
ELECTRIC MOTOR WITH ADJUSTABLE FIELD STRUCTURE
Filed Nov. 28, 1960  2 Sheets-Sheet 2

INVENTOR.
Albert N. Cook
WITNESS
BY
ATTORNEY

United States Patent Office 3,114,852
Patented Dec. 17, 1963

3,114,852
ELECTRIC MOTOR WITH ADJUSTABLE FIELD
STRUCTURE
Albert N. Cook, Bernardsville, N.J., assignor to The
Singer Company, a corporation of New Jersey
Filed Nov. 28, 1960, Ser. No. 72,044
2 Claims. (Cl. 310—191)

This invention relates to small electric motors and more particularly to motors of the type having a frame, a magnetic field structure, a rotatably mounted armature equipped with a commutator, and a plurality of brushes engaging the commutator.

In the past it has been customary to permanently secure the magnetic field structure to the motor frame, and to mount the brushes on a brush rigging or other movable member so that the brushes could be shifted relatively to the motor frame and the magnetic field structure. In the present disclosure the brushes are mounted directly on the motor frame and the primary object of the present invention is to provide an improved means for adjusting the relationship between the brushes and the magnetic field structure.

Another object of the invention is to provide an improved means for mounting the magnetic field structure so that the magnetic field structure can be shifted relatively to the motor frame and the brushes.

A still further object of the invention is to provide a special mounting for the field structure of a small sized electric motor.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

Figure 5:
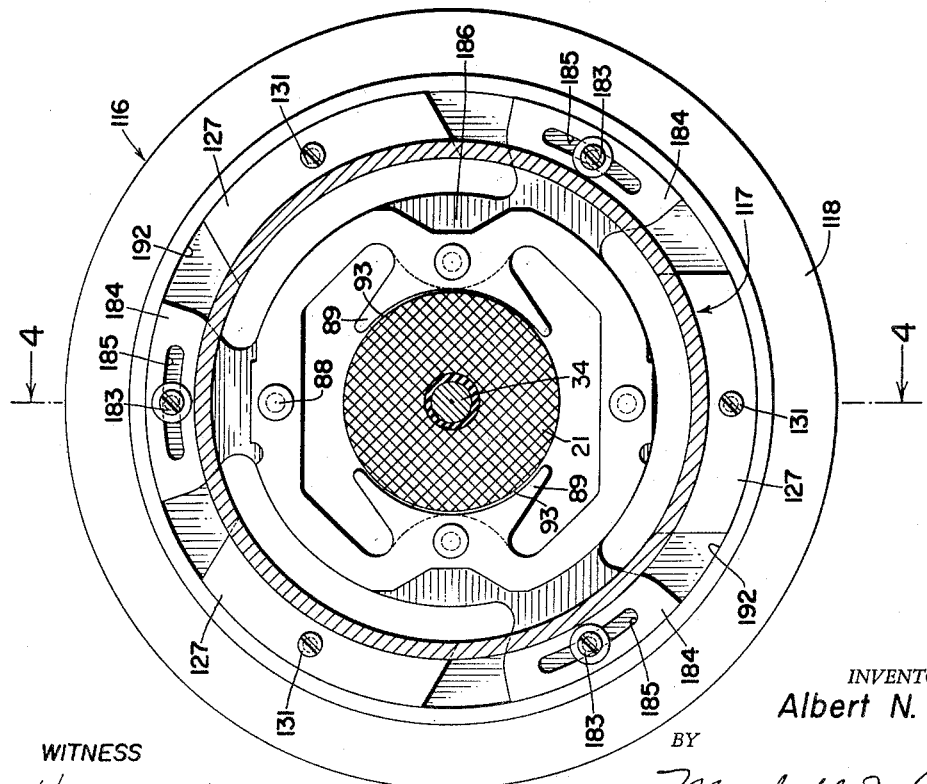

In the drawings:

FIG. 1 is a longitudinal sectional view taken substantially on the line 1—1 of FIG. 2 and showing an electric motor embodying the present invention, FIG. 2 is a sectional view taken on the broken line 2—2 of FIG. 1, FIG. 3 is a fragmentary side view taken on the line 3—3 of FIG. 1, FIG. 4 is a view similar to FIG. 1 but showing a longitudinal view taken on the line 4—4 of FIG. 5 of an electric motor embodying a modified form of the invention, and FIG. 5 is a sectional view taken substantially on the line 5—5 of FIG. 4.

A preferred embodiment of the invention is illustrated in FIGS. 1, 2 and 3 which disclose an electric motor 16 having a frame 17, an end bell 18, a magnetic field structure 19 and an armature 21.

The frame 17 has a cylindrical side wall 22 apertured by ventilating openings 23 and the frame 17 has an integrally formed cup-shaped end 24. The portion of the frame 17 remote from the end 24 is provided with a flange 26 (FIG. 2) having two kinds of radially disposed lugs 27 and 28. In the embodiment shown there are three lugs 27 spaced 120 degrees apart around the circumference of the frame 17. Also, there are three lugs 28 spaced 120 degrees apart around the circumference of the frame 17. The end bell 18 is formed with three lugs 29 spaced 120 degrees apart (only one lug 29 being shown) and the end bell 18 is secured to the frame 17 by three screws 31 which pass through unthreaded holes in the lugs 29 and enter threaded holes in the lugs 27.

The end 24 of the frame 17 is formed with a centrally located recess for reception of a self-aligning sleeve bearing 32 and the end bell 18 is formed with a centrally located recess for reception of a ball bearing 33. The bearings 32 and 33 rotatably support the shaft 34 of the armature 21 and its commutator 36.

The frame 17 of the motor 16 is equipped with two identical brush holder assemblies 38, which brush holder assemblies, per se, are similar to brush holder assemblies disclosed and claimed in my copending patent application Serial No. 15,960, filed March 18, 1960. Therefore, suffice it to say that each brush holder assembly 38 includes a carbon brush 41, a metallic brush tube 46, a non-metallic brush holder 51 provided with four ribs 53, 54, 63 and 64, and a bowed spring 77. Each brush holder 51 is held to the frame 17 by a means similar to that shown in application Serial No. 15,960, supra. This means for holding the brush holder includes four posts designated by the numerals 57, 58, 67 and 68. The brush holder assemblies 38 herein shown differ from those shown in application Serial No. 15,960 in that the four posts 57, 58, 67 and 68 of the present assemblies 38 are formed as part of the frame 17, whereas the posts of the former assemblies were formed as part of an end bell which was adjustably mounted with respect to the motor frame.

Each of the three lugs 28 (FIG. 2) is provided with an unthreaded elongated curved hole 82 and a screw 83 passes through each hole 82 and enters a threaded hole in one of the lugs 84 formed on a field end plate 86, which plate forms part of the magnetic field structure 19. A plurality of stacked field laminations 87 are clamped by rivets 88 to the plate 86 and the plate 86 and the field laminations 87 are formed in the shape of conventional magnetic pole pieces 89—89 around which it will be understood are wound field windings (not shown). In addition to this, the field plate 86 has three positioning fingers 91, the outer ends of which fingers 91 engage an inner accurately machined cylindrical surface 92 on the frame 17. The fingers 91 and the cylindrical surface 92 accurately position the pole pieces 89 and thus provide a proper air gap 93 between the ends of the pole pieces 89 and the armature 21.

From the above it will be understood that the two brush holder assemblies 38 are fixed in relation to the frame 17 and that the magnetic field structure 19 is relatively movable with respect to the frame 17 and the brush holder assemblies 38. Thus, when it becomes desirable to adjust the relative position between the brushes 41 and the magnetic field structure 19, the three screws 83 are loosened and the three lugs 84 are turned. This is possible because the screws 83 can move in the elongated holes 82. This operation shifts the position of the magnetic field structure 19 and thus changes the position of the pole pieces 89 with respect to the frame 17 and with respect to the brush holder assemblies 38. Because of the engagement of the ends of the fingers 91 with the cylindrical surface 92, a proper air gap 93 between the armature 21 and the pole pieces 89 is maintained.

FIGS. 4 and 5 of the drawings illustrate a modified embodiment of the invention comprising an electric motor 116, having an armature 21, a cup-shaped end 24, a sleeve bearing 32, a ball bearing 33, a shaft 34, a commutator 36, two brush holder assemblies 38 (each of which includes a carbon brush 41, a brush tube 46, a non-metallic brush holder 51 having ribs 53, 54, 63, 64 and posts 57, 58, 67 and 68, bowed spring 77), laminations 87, rivets 88, pole pieces 89 and an air gap 93. Each of the above named elements or parts of the motor 116 are duplicates of elements or parts forming the electric motor 16 shown in FIGS. 1, 2 and 3.

The electric motor 116 has a frame 117 provided with three radial lugs 127 spaced 120 degrees apart. An end bell 118 is secured to the end of the frame 117, which is remote from the cup-shaped end 24. This is accomplished by three screws 131 passing through unthreaded round holes formed in the lugs 127 and entering threaded holes in the end bell 118. The end bell 118 is accurately positioned relative to the frame 117 by reason of each of the lugs 127 having an arcuate free end abutting a machined cylindrical surface 192 formed on the end bell 118. A field end plate 186 is turnably secured to the end bell 118 by reason of the plate 186 having three radial lugs 184 which are spaced 120 degrees apart around the circumference. Each of the lugs 184 is provided with an arcuately slotted hole 185 through which passes a screw 183 which after passing through the hole 185 enters a threaded hole in the end bell 118. The free end of each of the lugs 184 is formed with an arcuate surface which abuts the above mentioned cylindrical surface 192 formed on the end bell 118. It will be noted, as best seen in FIG. 4, that the frame 117 is cut away at 190 in such a manner as to allow the lugs 184 to extend beyond the outer circumference of the frame 117 and to lie in the same plane as the lugs 127. A plurality of stacked field laminations 87 are clamped by means of rivets 88 to the field end plate 186 and the field plate 186 and the field laminations 87 are formed in the shape of conventional magnetic pole pieces 89—89 around with it will be understood are wound field windings (not shown). The lugs 127 and 184 and the machined cylindrical surface 192 accurately position the pole pieces 89 and thus provide a proper air gap 93 between the ends of the pole pieces 89 and the armature 21.

From the above it will be understood that, when it becomes desirable to adjust the relative position of the carbon brushes 41 (FIGS. 4 and 5) with respect to the pole pieces 89 (FIGS. 4 and 5), the screws 183 will be loosened. Then the field end plate 186 will be turned until the pole pieces 89 are properly positioned with respect to the brushes 41. Thereafter the screws 183 will be tightened in order to secure the parts in proper adjustment.

Having thus set forth the nature of this invention, what I claim herein is:

1. An electric motor comprising in combination a frame; a bearing supported by said frame; at least one brush also supported by said frame; a machined cylindrical surface formed on said frame; three equally spaced lugs formed on said frame, said lugs having arcuately elongated aperatures; an end bell; a bearing supported by said end bell; means for securing said end bell to said frame; an armature rotatably carried by said bearings; a magnetic field structure surrounding said armature; three apertured equally spaced lugs formed on said magnetic field structure, the apertures of said lugs being threaded; three equally spaced positioning fingers formed on said magnetic field structure, said positioning fingers having ends so constructed and arranged as to engage said machined cylindrical surface; and screws passing through the arcuately elongated apertures formed in the lugs of the frame and threaded into the threaded aperture of the magnetic field structure, thereby, properly positioning said magnetic field structure with respect to said armature and permitting adjustment of said magnetic field structure relative to said frame and to said brushes.

2. An electric motor comprising in combination a frame; a bearing supported by one end of said frame; at least one brush also supported by said frame; a machined cylindrical surface formed on said frame; three equally spaced lugs formed on said frame said lugs having arcuately elongated apertures concentrically positioned with respect to said machined cylindrical surface; an end bell; a bearing supported by said end bell; means for securing said end bell to said frame; an armature rotatably carried by said bearings; a magnetic field structure surrounding said armature; three apertured equally spaced lugs formed on said magnetic field structure, the apertures of said lugs being threaded; three equally spaced positioning fingers formed on said magnetic field structure, said positioning fingers having ends forming a circle concentric with the said machined cylindrical surface and so constructed and arranged as to engage said machined cylindrical surface; and screws passing through the arcuately elongated apertures formed in the lugs of the frame and threaded into the threaded aperture of the lugs formed on the magnetic field structure, thereby, properly positioning said magnetic field structure with respect to said armature and permitting adjustment of said magnetic field structure relative to said frame and to said brushes.

References Cited in the file of this patent

UNITED STATES PATENTS

| | | |
|---|---|---|
| 752,391 | Fleischmann | Feb. 16, 1904 |
| 2,060,244 | Roe | Nov. 10, 1936 |
| 2,450,664 | Jones | Oct. 5, 1948 |
| 2,629,063 | Ellis | Feb. 17, 1953 |